United States Patent
Lee et al.

(10) Patent No.: US 8,239,560 B2
(45) Date of Patent: Aug. 7, 2012

(54) SYSTEM AND GENERATION METHOD OF REMOTE OBJECTS WITH NETWORK STREAMING ABILITY

(75) Inventors: Jenq Kuen Lee, Hsinchu County (TW); Chung Kai Chen, Kaohsiung County (TW); Yu Hao Chang, Tainan (TW); Chih Chieh Yang, Hsinchu (TW); Kai Hsin Chung, Taipei (TW)

(73) Assignee: National Tsing Hua University, Hsinchu (TW)

( * ) Notice: Subject to any disclaimer, the term of this patent is extended or adjusted under 35 U.S.C. 154(b) by 609 days.

(21) Appl. No.: 11/864,147

(22) Filed: Sep. 28, 2007

(65) Prior Publication Data

US 2008/0209063 A1 Aug. 28, 2008

(30) Foreign Application Priority Data

Feb. 27, 2007 (TW) .............................. 96106619 A

(51) Int. Cl.
*G06F 15/16* (2006.01)
(52) U.S. Cl. ......... 709/231; 709/203; 709/217; 709/219
(58) Field of Classification Search .................. 709/231, 709/203, 217, 219
See application file for complete search history.

(56) References Cited

U.S. PATENT DOCUMENTS

| | | | | |
|---|---|---|---|---|
| 6,078,960 A * | 6/2000 | Ballard | ........................... | 709/229 |
| 6,125,400 A * | 9/2000 | Cohen et al. | ................... | 709/247 |
| 6,356,946 B1 * | 3/2002 | Clegg et al. | .................... | 709/231 |
| 6,434,622 B1 * | 8/2002 | Monteiro et al. | ............. | 709/231 |
| 6,477,580 B1 * | 11/2002 | Bowman-Amuah | .......... | 709/231 |
| 6,748,508 B1 * | 6/2004 | Khandelwal et al. | ......... | 711/170 |
| 6,795,858 B1 * | 9/2004 | Jain et al. | ...................... | 709/226 |
| 6,850,484 B1 * | 2/2005 | Greenspan et al. | ........... | 370/218 |
| 7,062,567 B2 * | 6/2006 | Benitez et al. | ................. | 709/231 |
| 7,197,570 B2 * | 3/2007 | Eylon et al. | .................... | 709/231 |
| 7,240,162 B2 * | 7/2007 | de Vries | ........................ | 711/137 |
| 7,318,107 B1 * | 1/2008 | Menon | .......................... | 709/239 |
| 7,606,924 B2 * | 10/2009 | Raz et al. | ....................... | 709/231 |
| 7,735,057 B2 * | 6/2010 | Rachman et al. | .............. | 717/100 |
| 8,095,679 B1 * | 1/2012 | Satish et al. | ................... | 709/231 |
| 2001/0037399 A1 * | 11/2001 | Eylon et al. | .................... | 709/231 |
| 2002/0078218 A1 * | 6/2002 | Feig | .............................. | 709/231 |
| 2002/0133611 A1 * | 9/2002 | Gorsuch et al. | ................ | 709/231 |
| 2003/0061305 A1 * | 3/2003 | Copley et al. | ................. | 709/217 |
| 2003/0182437 A1 * | 9/2003 | Kobayashi et al. | ........... | 709/232 |
| 2005/0076099 A1 * | 4/2005 | Wang et al. | .................... | 709/219 |

(Continued)

OTHER PUBLICATIONS

Chung-Kai Chen et al.; Switching Supports for Stateful Object Remoting on Network Processors; 2007.*

(Continued)

*Primary Examiner* — Abdullahi Salad
*Assistant Examiner* — Jimmy H Tran
(74) *Attorney, Agent, or Firm* — WPAT, P.C.; Anthony King

(57) ABSTRACT

A system of remote objects with network streaming ability includes a streaming client, a plurality of streaming servers, a streaming buffer area, a plurality of first continuous buffer areas, a streaming controller, a plurality of first network connections, and a plurality of second network connections. The plurality of streaming servers is used to respond a remote procedure call from the streaming client. The streaming buffer area stores a complete data unit for the streaming client to access. A generation method of remote objects with network streaming ability is further provided. The method includes executing a link procedure, executing a streaming preparation, executing a streaming transfer procedure, and closing the link procedure.

11 Claims, 3 Drawing Sheets

U.S. PATENT DOCUMENTS

| | | | |
|---|---|---|---|
| 2005/0195836 A1* | 9/2005 | Greenspan et al. | 370/401 |
| 2005/0228897 A1* | 10/2005 | Yamamoto et al. | 709/231 |
| 2006/0129665 A1* | 6/2006 | Toebes et al. | 709/223 |
| 2006/0168156 A1* | 7/2006 | Bae et al. | 709/220 |
| 2006/0184688 A1* | 8/2006 | Ganguly et al. | 709/232 |
| 2007/0214279 A1* | 9/2007 | Choi et al. | 709/231 |
| 2008/0086570 A1* | 4/2008 | Dey et al. | 709/231 |

OTHER PUBLICATIONS

Chung-Kai Chen et al.; Efficient Switching Supports of Distributed .NET Remoting with Network Processors; 2005; IEEE.*

Hsieh et al.; Enabling Streaming Remoting on Embedded Dual-Core Processors; Parallel Processing, 2008. ICPP '08. 37th International Conference, pp. 35-42; Sep. 2008.*

Staehli et al.; Designing adaptive middleware for reuse; ARM '04 Proceedings of the 3rd workshop on Adaptive and reflective middleware pp. 189-194 ACM New York, NY, USA © 2004.*

Gultchev et al.; Reconfigurable software based communication—video services in reconfigurable mobile devices 3G Mobile Communication Technologies, 2004. 3G 2004. Fifth IEE International Conference.*

* cited by examiner

SYSTEM AND GENERATION METHOD OF REMOTE OBJECTS WITH NETWORK STREAMING ABILITY

BACKGROUND OF THE INVENTION

1. Field of the Invention

The present invention relates to a system and a generation method of remote objects with network streaming ability, and more particularly, the present invention relates to a system and a generation method of remote objects with network streaming ability, which integrates a pushing mechanism, a forwarding mechanism, and an aggregation mechanism.

2. Description of the Related Art

In recent years, networking has developed rapidly and various network technologies are put forward accordingly. Among these novel technologies, peer-to-peer (P2P) data transfer is one of the most well-known technologies. Due to multicast transfer and query, the time for uploading/downloading and searching files over networks can be significantly reduced. The idea of a distributed object-oriented architecture has also become a hot research topic attracting much attention. For example, currently, Java RMI, COBRA, and .NET Remoting are the technologies widely used for building distributed component operation and a remote procedure call.

Although the P2P data transfer and the remote procedure call technologies have become quite mature, they still have some defects in performance. As for the P2P data transfer technology, despite reductions in downloading time, it cannot achieve the function of "manipulate-while-downloading," but only the object of manipulate-after-downloading can be achieved, which thus cannot ensure the correctness of the files. As for the remote procedure call, Java RMI, COBRA, and .NET Remoting all employ the call-and-wait mechanism, and every call must resort to the transfer over network, thereby naturally causing the performance to be deteriorated and the wait time to be prolonged.

Network streaming technology is one of the hot areas of research in recent years, and can be used to overcome the aforementioned defects. In the network streaming transfer, streaming data is obtained from the network by means of, for example, client-server transfer or peer-to-peer (P2P) transfer. Upon obtaining a specific amount of data, a demand side processes the data. Due to the network streaming technology, the performance for processing multimedia over network is enhanced, the data processing begins before the whole file is downloaded, that is to say, manipulate-while-downloading is achieved, which thus enhancing the flexibility in the application of the real-time multimedia.

Currently, in the distributed object-oriented system, the widely-used web service of "remote object procedure call," such as Java RMI and .NET Remoting, is established by a service provider, who also executes an object to implement the web service. With the "remote object procedure call" technology, the operating procedure (called a method or member function) of the object may achieve the object of providing services for a remote user through a remote call. However, the "remote object procedure call" technology cannot provide the remote objects with network streaming ability. Therefore, in order to enhance the application ability of the "remote object procedure call" technology in multi-media data transfer, it is necessary to develop a method for providing the remote objects with network streaming ability.

SUMMARY OF THE INVENTION

One aspect of the present invention relates to a system of remote objects with network streaming ability. A pushing mechanism, a forwarding mechanism, and an aggregation mechanism are used together and a middleware is inserted in the remote objects, such that the remote objects have network streaming ability. The middleware includes a streaming controller, a streaming buffer area, and a plurality of first and second continuous buffer areas.

Another aspect of the present invention relates to a generation method of remote objects with network streaming ability. A middleware is inserted into the remote objects, and a pushing mechanism, a forwarding mechanism, and an aggregation mechanism are used together, such that during a remote object procedure call, the establishment of a network connection and data transfer are both realized through this middleware. In this manner, the middleware may automatically intercept messages about the network streaming, and automatically convert the transfer of relevant data into a network stream, so as to enhance the performance.

The present invention provides a system of remote objects with network streaming ability, which includes a streaming client, a plurality of streaming servers, a streaming buffer area, a plurality of first continuous buffer areas, a streaming controller, a plurality of first network connections, and a plurality of second network connections. The plurality of streaming servers is used to respond to a remote procedure call from the streaming client. The streaming buffer area stores a complete data unit for the streaming client to access. The plurality of first continuous buffer areas receives a plurality of data units with a streaming object data type from the plurality of streaming servers, in which the complete data unit is associated with the plurality of data units with the streaming object data type. The streaming controller determines a plurality of available streaming servers among the plurality of streaming servers. The plurality of first network connections is established between the streaming client and the plurality of available streaming servers, and is used to transfer the plurality of data units with the streaming object data type only. The plurality of second network connections is established between the streaming client and the plurality of available streaming servers, and used to transfer control messages only.

The present invention further provides a generation method of remote objects with network streaming ability, which includes executing a link procedure, executing a streaming preparation, executing a streaming transfer procedure, and closing the link procedure. The step of executing the link procedure includes establishing a plurality of corresponding first network connections between the streaming client and the plurality of streaming servers according to a remote procedure call from a streaming client; and establishing a streaming controller by using the streaming client, in which the streaming controller controls the transfer of a plurality of data units with streaming object data type. The step of executing the streaming preparation includes collecting streaming source information from the plurality of streaming servers; and establishing a streaming schedule according to the streaming source information, in which the streaming schedule is associated with the plurality of available streaming servers. The step of executing the streaming transfer procedure is to provide a complete data unit for the streaming client to access, in which the complete data unit is associated with the plurality of data units with the streaming object data type. In another embodiment, the step of executing the link procedure further includes obtaining a plurality of corresponding addresses of the plurality of streaming servers and that of the streaming client, providing a plurality of data units with the streaming object data type among the plurality of streaming servers, registering each of the data units with the streaming object data type, treating each of the data units as a remote component, and waiting for the remote procedure call.

BRIEF DESCRIPTION OF THE DRAWINGS

The invention will be described according to the appended drawings in which.

DETAILED DESCRIPTION OF THE INVENTION

Figure 1:
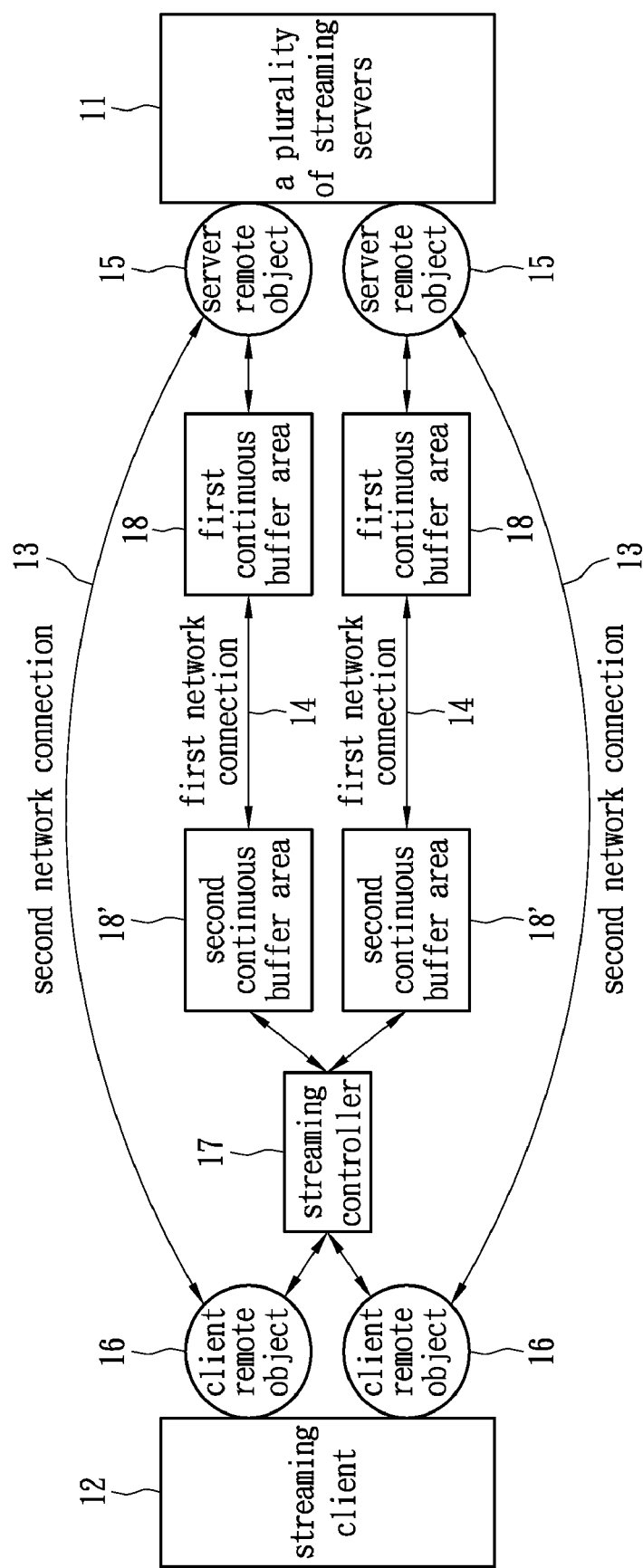
FIG. 1 shows a system of remote objects with network streaming ability according to an embodiment of the present invention.

In order to explain the generation method of remote objects with network streaming ability provided by the present invention more clearly and fluently, a system of remote objects with network streaming ability provided by the present invention is first described below. FIG. 1 shows a system of remote objects with network streaming ability according to an embodiment of the present invention. The system includes a plurality of streaming servers 11 (two streaming servers in this embodiment), a streaming client 12, a streaming controller 17, a streaming buffer area (not shown), two first continuous buffer areas 18, two first network connections 14, two second network connections 13, two second continuous buffer areas 18', two client remote objects 16, and two server remote objects 15. The plurality of streaming servers 11 is used to respond a remote procedure call from the streaming client 12. The streaming buffer area (not shown) is used to store a complete data unit for the streaming client to access. The two first continuous buffer areas 18 receive a plurality of data units with the streaming object data type from the plurality of streaming servers 11, and the complete data unit is associated with the plurality of data units with the streaming object data type. The streaming controller 17 is used to determine a plurality of available streaming servers among the plurality of streaming servers 11. The plurality of first network connections 14 is established between the streaming client 12 and the plurality of available streaming servers and is used to transfer the plurality of data units with the streaming object data type only. The plurality of second network connections 13 is established between the streaming client 12 and the plurality of available streaming servers and used to exchange control messages only.

The system of remote objects with network streaming ability provided by the present invention may be applied in Java RMI or .NET Remoting. Referring to FIG. 1, when the system is applied in Java RMI, the streaming server 11 and the streaming client 12 are respectively an RMI server and a client. The second network connection 13 is a Socket connection required to be established for an RMI call. The first network connection 14 is a Socket connection additionally generated for network streaming. The two server remote objects 15 are server objects in the Socket connection. The client remote object 16 is a client object in the Socket connection. The streaming controller 17, the first continuous buffer areas 18, the second continuous buffer area 18', and the streaming buffer area are contained in an inserted middleware in the present invention, which are all software components. When the system is applied in the .NET Remoting, the streaming servers 11 and the streaming client 12 are respectively a Remoting server and a Remoting client. The second network connection 13 is a Channel connection established for a Remoting call. The first network connection 14 is a Channel connection additionally generated for the network streaming. The two server remote objects 15 are server objects in the Channel connection. The client remote object 16 is a client object in the Channel connection. The streaming controller 17, the first continuous buffer areas 18, the second continuous buffer area 18', and the streaming buffer area are contained in an inserted middleware in the present invention, which are all software components.

Figure 2:
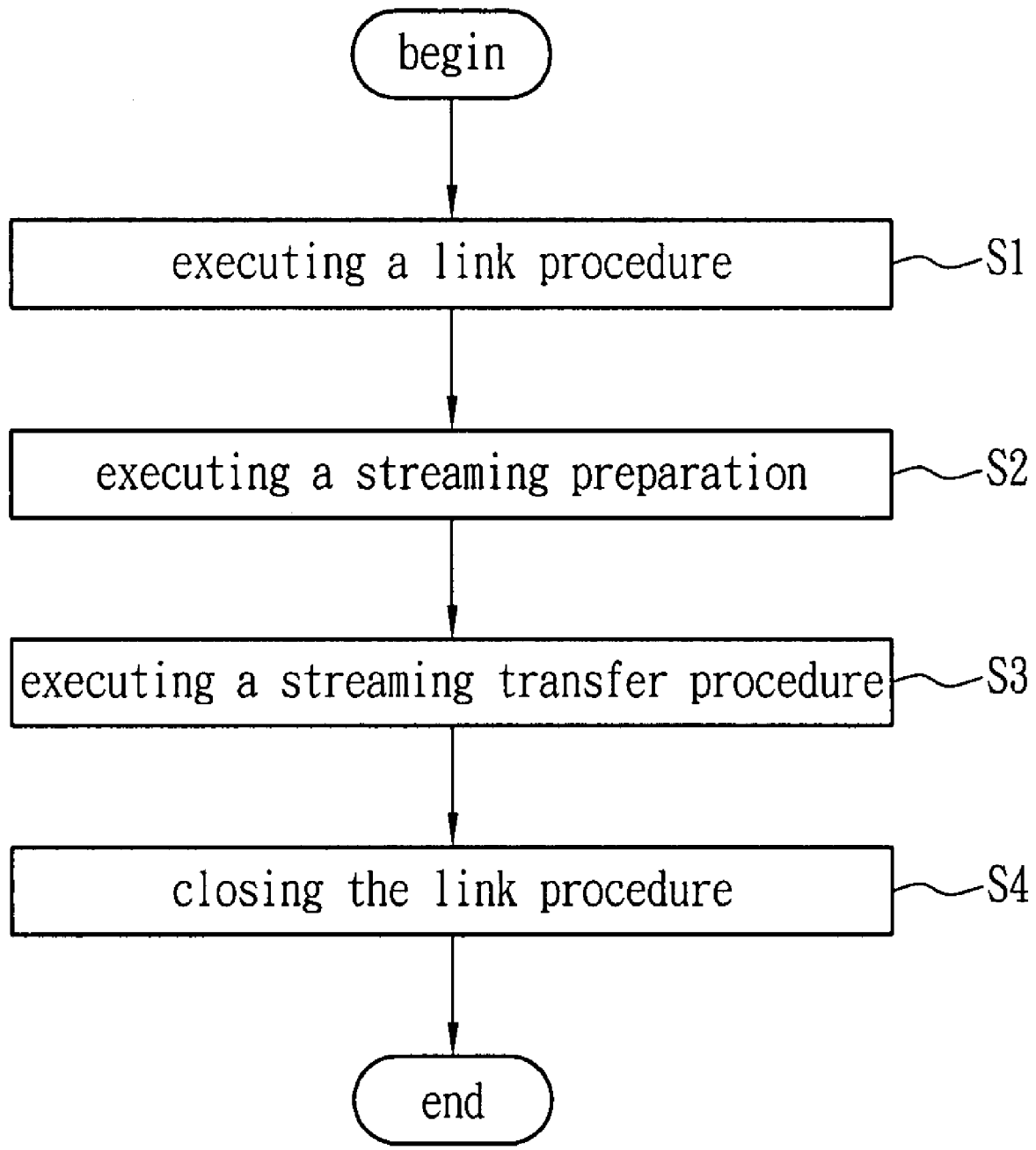
FIG. 2 is a flow chart of the generation method of remote objects with network streaming ability according to the present invention.

FIG. 2 is a flow chart of a generation method of remote objects with network streaming ability according to the present invention. The generation method includes executing a link procedure S1, executing a streaming preparation S2, executing a streaming transfer procedure S3, and closing the link procedure S4. Each of the above steps will be described in detail below. Referring to FIG. 1, the step S1 of executing the link procedure includes performing the following actions at the streaming servers 11, i.e., (a) querying the address information of a local computer through an operating system or an execution environment; (b) searching for files in the local computer as network streaming data, and building these files to have a streaming object data type, such that these files possess network streaming ability; (c) treating all the streaming objects as a remote component to be registered at a register side, such that the network streaming function can be achieved through a remote procedure call; (d) each of the streaming objects waiting for a remote procedure call from the streaming client 12, so as to realize the network streaming transfer; and (e) after the remote procedure call is received, additionally establishing a first network connection 14 between the streaming client 12 and each of the streaming servers 11, used for network streaming. The step S1 of executing the link procedure includes performing the following actions at the streaming client 12, i.e., (a) querying the address information of the local computer through the operating system or the execution environment; (b) sending an instruction of a remote procedure call to the streaming servers, so as to call a streaming object to perform the network streaming transfer; and (c) after the connection is established, establishing a streaming controller to relatively process the network streaming. The first network connections 14 are used to transfer the plurality of data units with the streaming object data type only.

Figure 3:
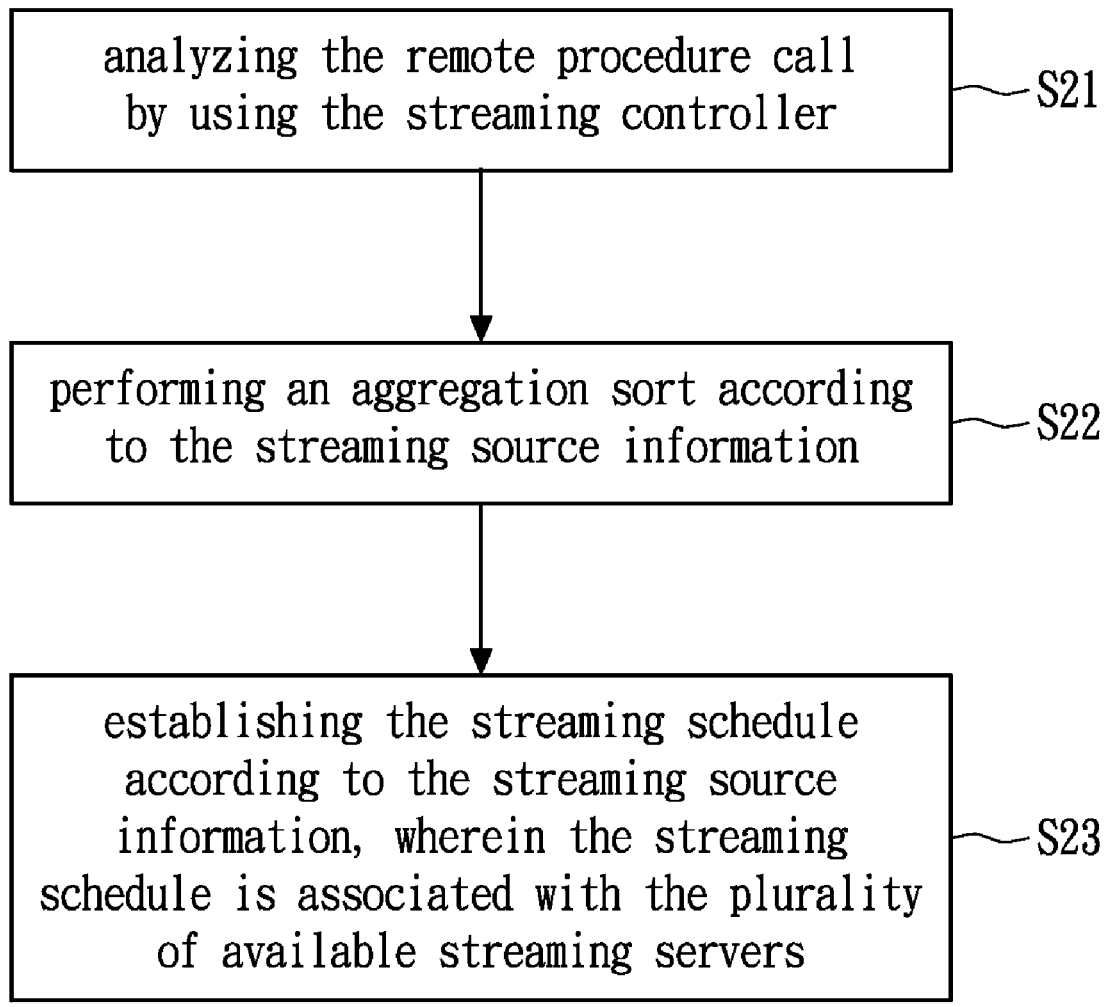

The step S2 of executing the streaming preparation includes setting the preparation of the network streaming. The streaming controller 17 determines the streaming servers with which the remote procedure call is established according to the user's streaming requirements for the streaming client 12, so as to realize the network streaming transfer. The detailed steps are described as follows. The streaming controller 17 retrieves the remote procedure call from the streaming client 12, analyzes the remote procedure call first, and then determines whether it is a remote procedure call for calling a remote streaming object. If the remote procedure call is a call for calling a remote streaming object, the streaming controller 17 establishes a streaming schedule according to the requirements of the streaming client 12 and the amount of available resources on the network. In other words, the step S2 of executing the streaming preparation includes: collecting streaming source information from the plurality of streaming servers 11, analyzing the remote procedure call by using the streaming controller 17 (Step S21 in FIG. 3), performing an aggregation sort according to the streaming source information (Step S22 in FIG. 3), and establishing the streaming schedule according to the streaming source information (Step S23 in FIG. 3). The streaming schedule is associated with the plurality of available streaming servers, the aggregation sort is used to determine the plurality of available streaming servers, and the streaming schedule is formed according to the plurality of available streaming servers.

The aggregation sort includes calculating a weight for each of the plurality of streaming servers 11. The weight is associated with a bandwidth, streaming data integrity, and an overhead of the corresponding streaming servers 11, and the priority of the plurality of available streaming servers is determined according to the weight. The greater the weight, the more preferred the selection is. When the generation method of remote objects with network streaming ability provided by the present invention is applied in Java RMI, the weight (weight($s_i$)) of each of the streaming servers can be defined through the following equation (1), $$\text{weight}(s_i) = \alpha \times \frac{r_i}{Req(d_j)} + \beta \times \text{Completeness}(s_i) + \gamma \times \frac{1}{k_i}, \quad (1)$$

in which Completeness($s_i$) represents the data integrity in the streaming server $s_i$, and Completeness($s_i$) may be defined through the following equation (2), $$\text{Completeness}(s_i) = \frac{\text{size}(\text{Blocks}(s_i))}{\text{size}(D)} \quad (2)$$

Furthermore, $S=\{s_i|i=1,2,\ldots,n\}$ represents a collection of the streaming servers, $D=\{d_j|j=1,2,\ldots,m\}$ represents a collection of data blocks, Blocks($s_i$) represents data blocks in the server $s_i$, $k_i$ represents the amount of the existing streaming data, $r_i$ represents the bandwidth provided by the server $s_i$, Req($d_j$) represents a bandwidth required by the streaming transfer, and the coefficients $\alpha$, $\beta$, and $\gamma$ may cause different priority sequences of the streaming servers according to different network environments. $\alpha$ represents the proportion of the bandwidth provided for the streaming server, $\beta$ represents the proportion of the data integrity for the data existing in the streaming server, and $\gamma$ is inversely proportional to the amount of the streaming media on the streaming servers. The aggregation sort firstly calculates the weights of each of the streaming servers, and then sorts the plurality of streaming servers according to their weights. During the streaming data transfer, the streaming servers are used in sequence of weights, until a bandwidth sufficient for transferring the streaming data is provided. It should be noted that the weight represented by Equation (2) is formed by three items, namely, the bandwidth, the streaming data integrity, and the overhead relevant to the streaming server.

Referring to FIG. 2 again, after the streaming preparation S2 is executed, a streaming transfer procedure S3 is performed. The step S3 of executing the streaming transfer procedure is to transfer data over network streaming, and the data from the plurality of streaming servers (i.e., the data units with the streaming object data type) is stored in the second continuous buffer area 18' (shown in FIG. 1). After an aggregation procedure is executed, the data units are formed into a complete data unit (which is formed through the streaming controller 17) stored in the streaming buffer area for the streaming client 12 to access. In other words, the step S3 of executing the streaming transfer procedure includes: establishing a first continuous buffer area 18 for each of the plurality of available streaming servers according to the streaming schedule, so as to receive the corresponding data unit with the streaming object data type, establishing a second continuous buffer area 18' for each of the plurality of available streaming servers, and transferring the plurality of data units with the streaming object data type to a streaming buffer area from the plurality of available streaming servers, so as to form the complete data unit. The second continuous buffer area 18' and the first continuous buffer areas 18 form a pair of buffer areas, and the plurality of data units with the streaming object data type is transferred through the pair of buffer areas. The pushing mechanism adopted in the present invention is a data streaming transfer mechanism, which is obviously different from the call-and-wait mechanism adopted by a conventional remote procedure in terms of the operation mode. In the design of the pushing transfer mechanism, the streaming data begins to be transferred without interruption, as long as the connection is established and relevant streaming information has been set. If the present invention is applied in Java RMI, the objects in the continuous buffer area are used for implementing the pushing mechanism, and the first continuous buffer areas at the streaming server side may continuously transfer the data to the second continuous buffer area at the streaming client side. The forwarding mechanism is a mechanism for relieving the overhead of the streaming servers. When the streaming data is demanded, the streaming data may not be obtained from the streaming server, but from the streaming client storing the streaming data. As such, the streaming client is responsible for the operation of the streaming server, so that the overhead of the streaming server is relieved. The aggregation mechanism is a mechanism for obtaining data, and different streaming servers may store the same data. Through the aggregation mechanism (or aggregation procedure), data can be obtained from the plurality of streaming servers simultaneously. In this manner, a load balance may be achieved and the bandwidths of the plurality of streaming servers may satisfy the streaming transfer requirements. Finally, all the data units are combined into the complete data unit.

The above-described embodiments of the present invention are intended to be illustrative only. Numerous alternative embodiments may be devised by persons skilled in the art without departing from the scope of the following claims.

What is claimed is:

1. A generation method of remote objects with network streaming ability, comprising the steps of:

executing a link procedure, comprising the steps of:

establishing a plurality of corresponding first network connections between a streaming client and a plurality of streaming servers according to a remote procedure call from the streaming client; and establishing a streaming controller by using the streaming client, wherein the streaming controller controls the transfer of a plurality of data units between the streaming client and the plurality of streaming servers with a streaming object data type;

executing a streaming preparation, comprising the steps of:

collecting streaming source information from the streaming servers; and establishing a streaming schedule according to the streaming source information, wherein the streaming schedule is associated with a plurality of available streaming servers;

analyzing the remote procedure call by using the streaming controller, the streaming controller performing an aggregation sort according to the streaming source information, and the streaming controller forming the streaming schedule according to available streaming servers, wherein the aggregation sort includes calculating a weight for each of the streaming servers, the weight of each streaming server is determined by:

$$\text{weight}(s_i) = \alpha \times (r_i/\text{Req}(d_j)) + \beta \times \text{Completeness}(s_i) + \gamma \times 1 (1/k_i)$$

where Completeness($s_i$) represents data integrity in the streaming server $s_i$, and the Completeness ($s_i$) is determined by:

Completeness($s_i$)=(size(Blocks($s_i$))/size(D));

where S={$s_i$ |i=1,2, . . . ,n} represents a collection of the streaming servers, D={$d_j$ |j=1,2, . . . ,m} represents a collection of data blocks, Blocks($s_i$) represents data blocks in each server $s_i$, $k_i$ represents an amount of existing streaming data, $r_i$ represents a bandwidth provided by the server $s_i$, Req($d_j$)) represents a bandwidth required by a streaming transfer, and the α0 represents a proportion of the bandwidth provided for the streaming server, the β represents a proportion of data integrity for data existing in the streaming server, and γ is inversely proportional to an amount of a streaming media on the streaming servers;

executing a streaming transfer procedure to provide a complete data unit for the streaming client to access, wherein the complete data unit is associated with the data unit with the streaming object data type; and closing the link procedure.

2. The generation method of remote objects with network streaming ability of claim 1, wherein the step of executing the link procedure further comprises:

obtaining a plurality of corresponding addresses of the streaming servers and that of the streaming client; and providing the data unit with the streaming object data type from the streaming servers.

3. The generation method of remote objects with network streaming ability of claim 1, wherein the step of executing the link procedure further comprises:

registering each of the data units with the streaming object data type at a register side and treating each of the data units as a remote component; and waiting for the remote procedure call.

4. The generation method of remote objects with network streaming ability of claim 1, wherein the first network connections are used to transfer the plurality of data units with the streaming object data type only.

5. The generation method of remote objects with network streaming ability of claim 1, wherein the aggregation sort comprises the step of:

determining priorities of the available streaming servers according to their weight.

6. The generation method of remote objects with network streaming ability of claim 1, wherein the step of executing the streaming transfer comprises:

establishing a first continuous buffer area for each of the available streaming servers according to the streaming schedule so as to receive the corresponding data unit with the streaming object data type;

establishing a second continuous buffer area to form a pair of buffer areas with the first continuous buffer area; and transferring the data units with the streaming object data type from the available streaming servers to a streaming buffer area so as to form the complete data unit.

7. The generation method of remote objects with network streaming ability of claim 6, wherein the data unit with the streaming object data type is transferred through the pair of buffer areas.

8. The generation method of remote objects with network streaming ability of claim 6, wherein the second continuous buffer area is at the streaming client.

9. The generation method of remote objects with network streaming ability of claim 6, wherein each of the first network connections is established between the corresponding pair of buffer areas.

10. The generation method of remote objects with network streaming ability of claim 1, further comprising a step of establishing a plurality of second network connections, wherein the second network connections are used to transfer control messages only.

11. The generation method of remote objects with network streaming ability of claim 1, wherein the generation method is applied in one of Java RMI and .NET Remoting.

* * * * *